United States Patent [19]
Waltrip, III

[11] Patent Number: 5,953,909
[45] Date of Patent: Sep. 21, 1999

[54] COMBUSTOR FOR UNSPENT EXHAUST FROM AN INTERNAL COMBUSTION ENGINE

[76] Inventor: Owen R. Waltrip, III, 1711 Tanglewood La., Roseville, Calif. 95661

[21] Appl. No.: 09/128,356

[22] Filed: Aug. 3, 1998

[51] Int. Cl.[6] .......................................................... F01N 3/00
[52] U.S. Cl. .................................. 60/275; 60/303; 60/282
[58] Field of Search ............................. 60/275, 282, 303, 60/320

[56] References Cited

U.S. PATENT DOCUMENTS

| | | |
|---|---|---|
| 3,442,077 | 5/1969 | Youhouse . |
| 4,010,607 | 3/1977 | Hopping . |
| 4,304,096 | 12/1981 | Liu et al. .................................... 60/274 |
| 4,362,016 | 12/1982 | Papadopulos .............................. 60/297 |
| 4,376,637 | 3/1983 | Yang ........................................ 60/275 |
| 4,459,805 | 7/1984 | Kamiya et al. . |
| 4,505,106 | 3/1985 | Frankenberg et al. . |
| 4,892,073 | 1/1990 | Yamamoto et al. . |
| 5,211,152 | 5/1993 | Alexandrov . |
| 5,282,452 | 2/1994 | Urushiwara et al. . |
| 5,284,016 | 2/1994 | Stark et al. . |
| 5,320,523 | 6/1994 | Stark . |
| 5,404,860 | 4/1995 | Morino . |
| 5,511,532 | 4/1996 | Koelter . |
| 5,513,619 | 5/1996 | Chen et al. . |
| 5,584,178 | 12/1996 | Naegeli et al. . |

*Primary Examiner*—F. Daniel Lopez
*Assistant Examiner*—Binh Tran
*Attorney, Agent, or Firm*—Heisler & Associates

[57] ABSTRACT

A combustor 10 for enhancing the combustion of entrained fuel or oil in the exhaust stream of an internal combustion engine is provided. The combustor 10 includes a housing 20 and an expansion chamber 60 inserted into the exhaust stream. The housing 20 forms a cylindrical combustion chamber 27 which is transected by an ignition module 30 with a combustion grill 31. The ignition module 30 includes an insulator ring 40 in which two grates 32, 34 of electrodes 50 are mounted to form the combustion grill 31. The electrodes 50 are elongate rods which extend across the open area of the insulator ring 40 to form multiple chords of varying lengths. The electrodes 50 in each grate 32, 34 are oriented such that their central axes are parallel and substantially coplanar to adjacent electrodes 50 within the same grate 32, 34. The grates 32, 34 are substantially parallel, but rotated such that the central axes of the electrodes 50 of one grate 32, 34 are perpendicular to the central axes of the electrodes of the opposing grate 32, 34 to create a lattice-type electrode 50 configuration. A cascading electrical arcing pattern and distribution among the nodes formed between various electrodes 50 is provided. The arcing between electrodes 50 of the combustion grill 31 is controlled and managed by a spark generation module 70 which includes a computer module 76 which is programmable to appropriately modify arcing variables such as voltage and switching frequency based upon feedback from sensors in the exhaust stream.

20 Claims, 4 Drawing Sheets

COMBUSTOR FOR UNSPENT EXHAUST FROM AN INTERNAL COMBUSTION ENGINE

FIELD OF THE INVENTION

The present invention relates to combustors for burning uncombusted exhaust products from internal combustion engines. More particularly, this invention relates to combustors having a plurality of electrodes to produce a plurality of distributed electrical arcs to maximize the oxidation of uncombusted exhaust products from an internal combustion engine to reduce pollutant discharges to the atmosphere and bodies of water.

BACKGROUND OF THE INVENTION

It is well known that internal combustion engines generate exhaust streams whose components are not fully combusted, resulting in discharge of high pollutant levels. Two-cycle internal combustion engines, such as those used in motorcycles or various watercraft, tend to be the heaviest polluters. Personal watercraft, such as JETSKI, are known to discharge approximately thirty percent of their fuel to the body of water in which they are being used. These discharges foul the water and can result in downstream pollution of potable water supplies. Additionally, discharge of these uncombusted fuels into potable or recreational water supplies can create additional hazards due to the inclusion of other hazardous chemicals, such as methyl tetra-butyl ether (MTBE), in these fuels. MTBE is an additive used in California to reduce air pollutant levels from internal combustion engines. Although MTBE appears to provide cleaner combustion to minimize atmospheric or air pollution, uncombusted fuel containing MTBE can easily contaminate a water source. Unfortunately, MTBE is a suspected carcinogen. Discharge of uncombusted hydrocarbons and their associated chemical components to the atmosphere and waterways is a nationally recognized problem.

The prior art teaches several devices for completing the combustion of uncombusted hydrocarbon fuel expelled in the exhaust stream of a combustion engine. Some of these "combustors" require the addition of other fuel to supplement and maintain the burn required to fully oxidize the uncombusted exhaust components. This method increases fuel consumption and can result in higher levels of pollutant discharge.

Other types of combustors operate on a batch, rather than continuous, process. A batch process is most suitable where an engine may be shut down for a sufficient period of time to allow the uncombusted hydrocarbons to be burned off. This method is not suitable to applications, such as watercraft with two-cycle engines, where the volume of uncombusted fuel is substantial and not readily stored for subsequent burnoff.

Most notable of the prior art with reference to the present invention is a combustor invented by Naegeli (U.S. Pat. No. 5,584,178). The primary components of the Naegeli combustor include a combustion chamber and flame holder, with ignition means provided by a standard single sparkplug. Naegeli's combustor is shown installed in the exhaust piping from the internal combustion engine of a vehicle.

The Naegeli combustor is dependent on the ability of its flame holder to maintain a flame front to hopefully contact and burn off the uncombusted fuel components entrained within the exhaust stream of the internal combustion engine. It appears that the primary intended use for Naegeli's combustor is to preheat engine exhaust sufficiently to avoid fouling downstream exhaust treatment devices, such as a catalytic converter. Further, Naegeli's combustor uses a single sparkplug primarily to initiate combustion and establish a flame front on the flame holder; the "held flame" then theoretically provides the ignitive energy to continuously oxidize entrained combustibles in the exhaust stream. Naegeli describes an alternative embodiment of his invention which includes four sparkplugs uniformly dispersed about the circumference of one end of the combustion chamber. Even with four spark plugs, Naegeli's combustor provides insufficient ignitive energy via electrical arcing to provide reliable, continuous operation to ensure that the greatest percentage of entrained combustibles is oxidized.

Naegeli's combustor also negatively affects engine performance due to the increased back pressure resulting from exhaust flow restriction caused by the presence of the flame holder plate within the exhaust system piping. Additionally, given its substantial surface area, the flame holder plate is susceptible to fouling with oil or other components within the exhaust stream. Fouling may tend to plug penetrations in the flame holder plate which would further restrict the exhaust flow and negatively affect engine performance.

Accordingly, a need exists for a combustor system which can continuously and reliably enhance oxidation of uncombusted fuel, oil or other hydrocarbons entrained within the exhaust stream from an internal combustion engine to reduce overall pollutant levels and minimize discharge of uncombusted fuel and associated chemical components to the atmosphere, and particularly, to recreational or potable water supplies.

SUMMARY OF THE INVENTION

The present invention is a combustor for enhanced in-situ combustion of fuel or oil entrained within the exhaust stream from an internal combustion engine. The invention includes a cylindrical housing which forms a combustion chamber and incorporates an electrical arc generation device to provide ignitive energy causing entrained combustibles to ignite and substantially oxidize. The electrical arc generation device is a dual-layered grill of rod-shaped electrodes including appropriately distributed cathodes and anodes. The grill includes a first horizontal grate of electrodes and a second opposing vertical grate of electrodes. The electrodes of each grill are mounted in a circumambient insulator ring which conforms to the inner shape of the housing. The electrode grill provides both a means of ignition and a means for enhancing mixture of the exhaust stream to maximize combustion of any unspent fuel products.

The insulator ring provides a framework to retain and to appropriately orient the electrodes in a grid-like configuration. The insulator ring includes a plurality of non-penetrating cylindrical wells and complete cylindrical penetrations which receive and retain the ends of the electrodes. The wells do not fully penetrate the insulator ring so that the ends of the electrodes held within the wells are insulated and cannot electrically ground to the housing of the combustor. The penetrations allow a plurality of electrodes held within the penetrations to be electrically grounded to earth or connected to a separate electric potential or voltage source. The wells and penetrations are arranged such that the cathodes are separated a sufficient distance from the anodes so that sufficient electric potential supplied to a cathode will cause a luminous electrical arc of high temperature to be generated by the transmission of ionizing electrons across a highly resistive void from the cathodes to the separate anodes.

The combustor of the present invention is preferably mounted and incorporated within the exhaust piping system from an internal combustion engine. In use and operation, exhaust and associated uncombusted fuel from the internal combustion engine enters an inlet of the combustor to flow across and through both layers of the electrode grill. As the internal combustion engine is running and the exhaust is flowing across the electrode grill, electrical current with sufficient voltage potential is applied to the cathodes of the electrode grill to create a layer of a plurality of electrical arcs distributed across the cross-sectional area of the electrode grill. The blanket of electrical arcs maximizes the probability of combusting any unspent fuel within the exhaust stream by maximizing the potential for the ignitive energy of the multiple electrical arcs to be exposed to uncombusted entrained fuel or oil within the exhaust stream. As the exhaust stream passes through the voids within the electrode grill, unspent fuel is combusted which creates additional products of combustion resulting in a corresponding increase in the volumetric flow rate of the exhaust stream. These additional combustion products and the existing exhaust stream pass into a downstream expansion chamber of the combustor. The expansion chamber minimizes the back pressure on the electrode grill by accommodating the increased volume of the exhaust stream. The exhaust stream and additional combustion gases then pass through the expansion chamber to exit into the downstream portion of the exhaust piping to be discharged out the exhaust tailpipe to the atmosphere.

OBJECTS OF THE INVENTION

Accordingly, a primary object of the present invention is to provide a combustor which can be used to enhance oxidation of unspent fuel or oil entrained within the exhaust stream from an internal combustion engine.

Another object of the present invention is to provide a combustor with a means of ignition able to substantially saturate the entire cross-sectional area of the exhaust flow stream with ignitive energy.

Another object of the present invention is to provide a combustor with a means of ignition having substantial electrode surfaces to extend the operating life cycle of the combustor.

Another object of the present invention is to provide a combustor that may be used to enhance exhaust stream oxidation in either a four cycle engine application or a two cycle engine application.

Another object of the present invention is to provide a combustor which minimizes pollutant levels discharged from an internal combustion engine.

Another object of the present invention is to provide a combustor whose physical properties may be easily modified to accommodate varying engine applications.

Another object of the present invention is to provide a combustor that minimizes parasitic back pressure placed upon the internal combustion engine while igniting unspent fuel or oil entrained within the exhaust stream from the internal combustion engine.

Another object of the present invention is to provide a combustor whose component parts are easily replaceable and do not require full disassembly of the engine exhaust system for replacement.

Another object of the present invention is to provide a combustor of simple and reliable manufacture, made from inexpensive and readily available materials.

Another object of the present invention is to provide an auxiliary power supply by placing a combustor in an exhaust stream of an internal combustion engine.

Other further objects of the present invention will become apparent from a careful reading of the included drawing figures, the claims and detailed description of the invention.

DESCRIPTION OF THE PREFERRED EMBODIMENT

Referring to the drawings, wherein like reference numerals represent like parts throughout the various drawing figures, reference numeral 10 (FIGS. 1 and 2) is directed to a preferred embodiment of a combustor for enhancing combustion of unspent fuel and oil entrained within the exhaust stream of an internal combustion engine. The combustor 10 includes an ignition module 30 (FIG. 3) with a combustion grill 31 having electrodes 50 which create a blanket of electrical arcs to ignite combustible material entrained in the exhaust stream from an internal combustion engine. The combustor 10 reduces pollutant emissions from internal combustion engines, particularly two-cycle engines, by burning uncombusted fuel or oil entrained within the exhaust stream.

Figure 1:
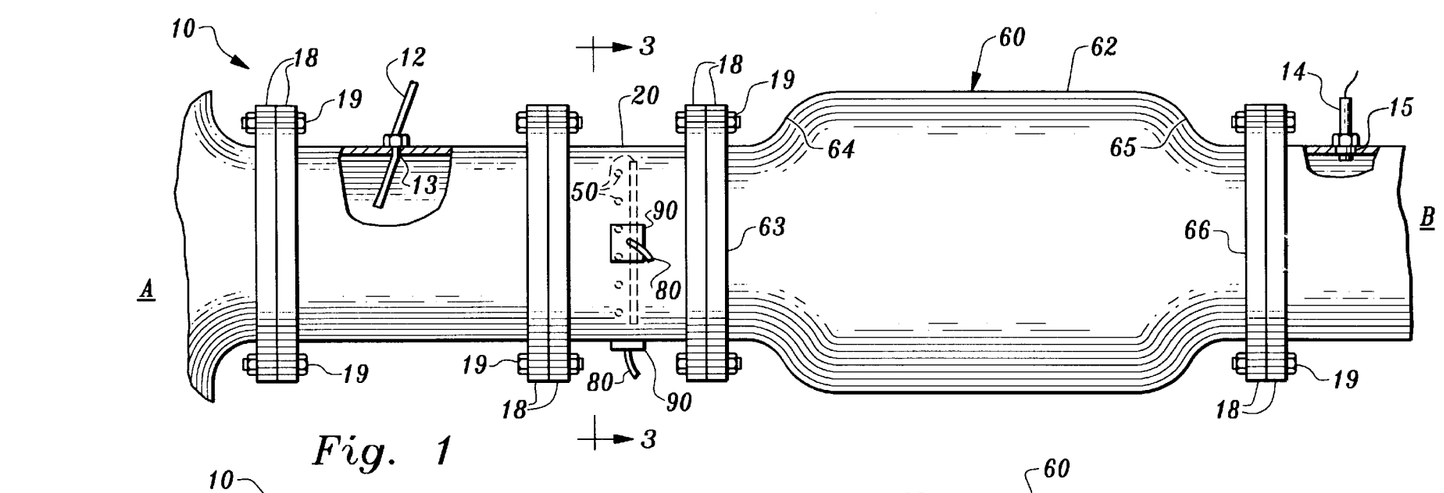
FIG. 1 is a side elevation view of the combustor of the present invention as installed in the exhaust piping system of a typical automobile and depicting the electrodes of the combustion grill in broken lines.
Figure 4:
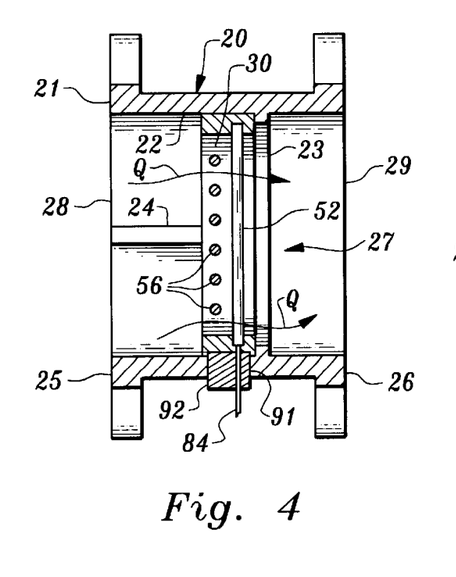
FIG. 4 is a sectional view taken along the lines 4—4 of FIG. 3.
Figure 5:
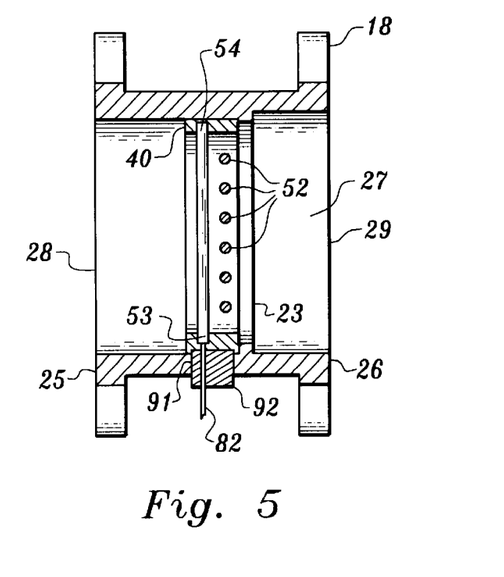
FIG. 5 is a sectional view taken along the lines 5—5 of FIG. 3.

In essence, and with particular reference to FIG. 1, the basic details of the combustor 10 are described. The combustor 10 includes a housing 20 which encloses a combustion chamber 27 (FIG. 4). The ignition module 30 with the combustion grill 31 preferably transects the combustion chamber 27 and housing 20. An insulator ring 40 forms the peripheral framework of the ignition module 30 to securely receive the combustion grill 31. A plurality of electrodes 50 are rooted in the insulator ring 40 to form the combustion grill 31. The housing 20 is coupled to a downstream expansion chamber 60. A spark or electrical arc generation module 70 manages the voltage, transmission and timing of electrical current delivered to the electrodes 50. Electrical cables 80 conduct electrical current from the spark generation module 70 to the electrodes 50 of the ignition module 30. The cables 80 are releasably coupled and electronically connected to the insulator ring 40 and electrodes 50 via electrical connectors 90.

Figure 2:
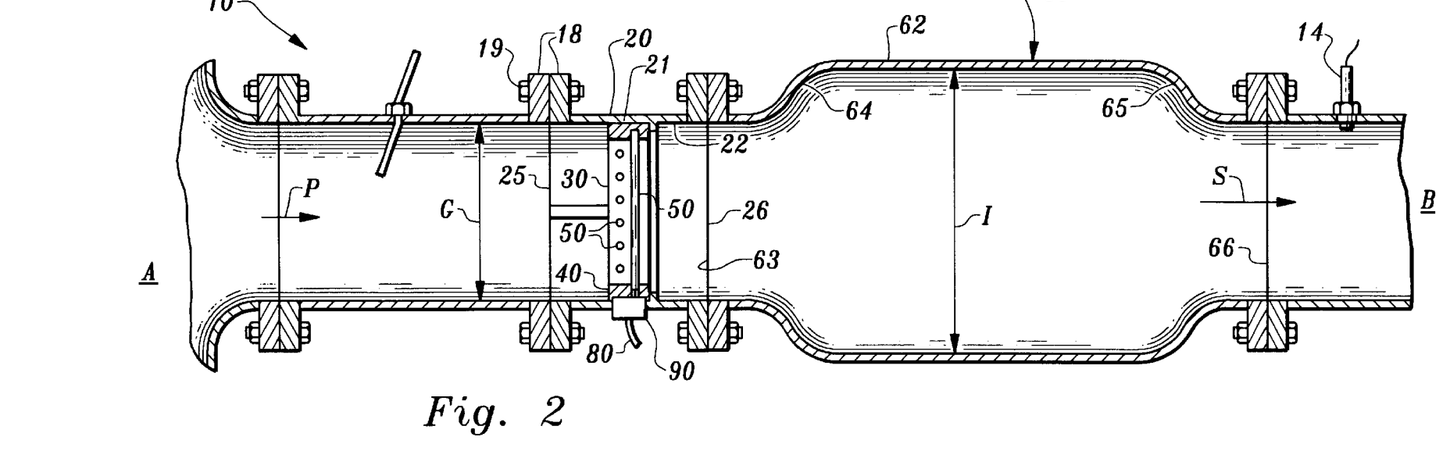
FIG. 2 is a full cross-sectional elevation view of that which is shown in FIG. 1.
Figure 7:
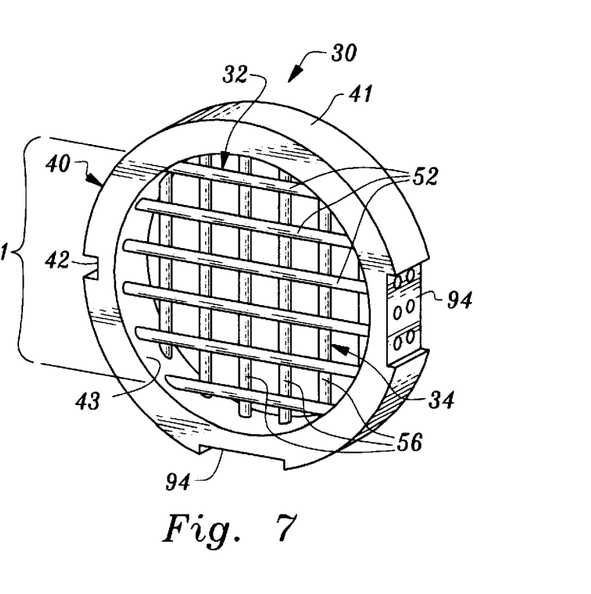
FIG. 7 is a perspective view of the housing of the combustor of the present invention, without the ignition module installed.

More particularly, and with initial reference to FIGS. 1, 2 and 7, details of the combustor 10 are provided. The combustor 10 includes the cylindrical rigid housing 20. The housing 20 is interposed between an upstream exhaust manifold region A of the internal combustion engine and a downstream tailpipe B of the engine's exhaust piping system. The housing 20 is preferably made of tubular material similar to that used for automobile exhaust piping systems. The housing 20 has a cross-sectional diameter G substantially equivalent to that of the vehicle exhaust piping.

The housing 20 includes a cylindrical peripheral wall 21 with an inner surface 22 that surrounds and encloses a central region of the housing 20 to form a preferably cylindrical combustion chamber 27 (FIG. 7). A first end 25 of the housing 20 is oriented nearest the upstream exhaust manifold region A of the vehicle exhaust system. The first end 25 of the housing 20 includes means to releasably couple the housing 20 to the upstream exhaust manifold region A of the engine. The first end 25 includes a mating and sealing flange 18 about its periphery which is sized to mate with an opposing flange 18 on the downstream end of the upstream portion of the exhaust piping nearest the exhaust manifold region A. The flanges 18 are releasably joined via a fastener means. The fastener means includes bolt and nut connections 19 as shown. The illustrated fastener means are but one form of the means to releasably couple the combustor 10 to the vehicle exhaust piping system as well as other components of the combustor 10. Other means may include welded connections, threaded connections, clamped connections and other similar connections particularly those which are able to releasably connect the combustor 10 with the exhaust piping of the vehicle.

The first end 25 of the housing 20 forms a passage way for exhaust gases and uncombusted fuel or oil to move from the upstream manifold region A of the exhaust system into the combustion chamber 27 of the combustor 10 (FIG. 2). The housing 20 includes a second end 26 downstream from and opposite the first end 25. The planes formed by the first end 25 and second end 26 are substantially parallel and axially-aligned, having preferably equivalent circular shapes. Thus symmetrically configured, the housing 20 of the combustor 10 may be inserted into the exhaust piping system of a vehicle in either direction. Either end 25, 26 of the housing 20 may be oriented toward either the upstream exhaust manifold region A of the engine or the downstream tailpipe B of the exhaust system. This geometric equivalence simplifies installation of the combustor 10 within the vehicle exhaust system, by eliminating the need to orient the housing 20 of the combustor 10 in a predetermined direction.

Figure 8:
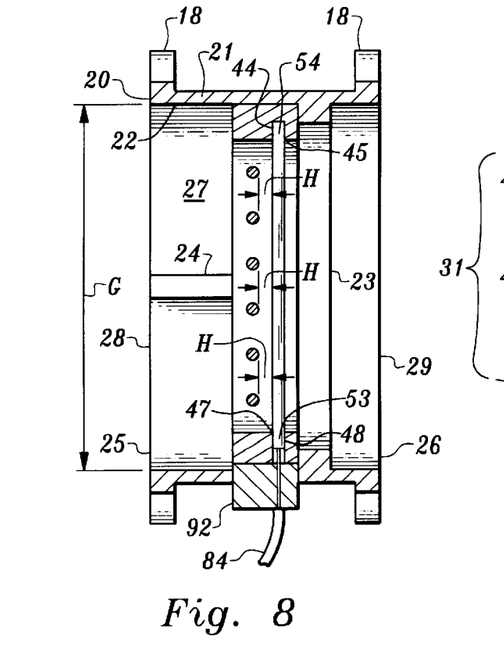
FIG. 8 is an enlarged view of that which is shown in FIG. 4 and identifying a spacing between anodes and cathodes of the combustion grill.

The combustion chamber 27 of the housing 20 has a generally-cylindrically shaped volume with a preferably constant cross-sectional diameter G (FIGS. 2 and 8). An inlet 28 (FIGS. 4–6 and 8) to the combustion chamber 27 adjacent and defined by the inner perimeter of the first end 25 of the housing 20 provides a passageway for the internal combustion engine exhaust stream to move from the upstream exhaust manifold region A into the combustion chamber 27. An opposing downstream outlet 29 of the combustion chamber 27 adjacent and defined by the inner perimeter of the second end 26 of the housing 20 provides a passageway for the exhaust stream to exit the combustion chamber 27 to pass into the expansion chamber 60 of the combustor 10, traveling in a downstream direction toward the tailpipe B.

Figure 6:
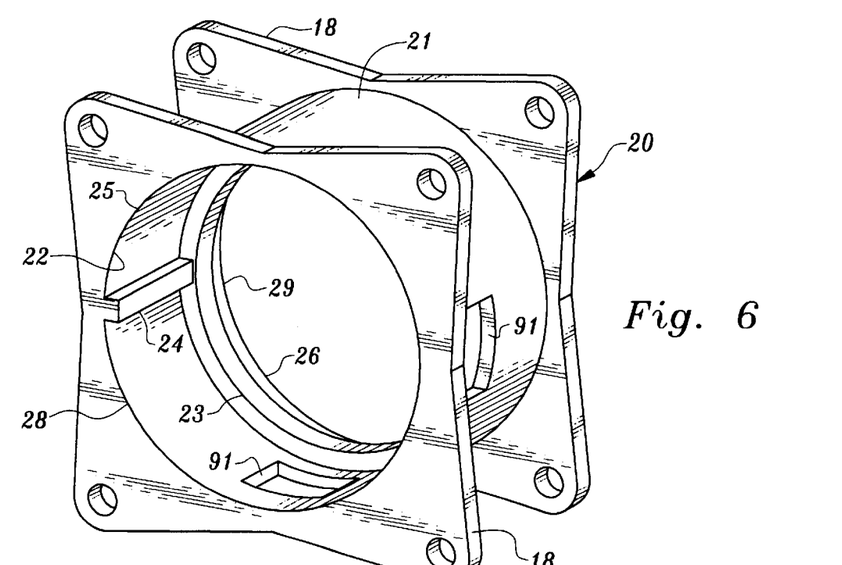
FIG. 6 is a perspective view of the ignition module of the combustor of the present invention.

As most clearly shown in FIGS. 6 and 8, a stop ring 23 is located preferably near the median of the combustion chamber 27. The stop ring 23 extends inwardly and peripherally about the circumference of the inner surface 22 of the peripheral wall 21 of the housing 20. The stop ring 23 is preferably oriented such that the plane containing the ring is perpendicular to the central axis of the combustion chamber 27. The stop ring 23 divides the housing 20 and combustion chamber 27 of the combustor 10 into somewhat bilaterally symmetrical upstream and downstream halves.

The stop ring 23 acts as one form of a means to locate the insulator ring 40 and the combustion grill 31 of the ignition module 30 in a proper position at the approximate midpoint of the combustion chamber 27. Other means may include smaller protruding stops, a reduction in diameter G of the combustion chamber 27, a detente mechanism which releasably engages the inner surface 22 of the wall 21 of the housing 20, a set screw arrangement which threads through a threaded penetration in the wall 21 of the housing 20 to seat in an orienting recess in an outer surface 41 of the insulator ring 40, or other similar means which serve to retain the place and orientation of the ignition module 30. The location of the stop ring 23 along the length of the housing 20 may be varied to accommodate differing engine applications, ignition module 30 configurations and insulator ring 40 thickness.

Referring to FIGS. 4, 6 and 8, an elongate alignment ridge 24 extends inwardly from the inner surface 22 of the wall 21 of the housing 20 to act as a keyway to properly orient the ignition module 30 within the housing 20. The alignment ridge 24 extends from the first end 25 of the housing 20 to intersect and terminate at the stop ring 23. The alignment ridge 24 has a preferably rectangular profile and corresponds to slidably mate with an alignment groove 42 of the insulator ring 40 (FIG. 7). The mating of the alignment ridge 24 of the housing 20 with the alignment groove 42 of the insulator ring 40 orients the insulator ring 40 to ensure that two socket electrical connectors 94 are properly positioned within the housing 20 of the combustor 10 with the face of each electrical connector socket 94 aligned with corresponding ports 91 which penetrate the wall 21 of the housing 20 (FIG. 6).

As shown in FIG. 4, installed within the housing 20, the ignition module 30 transects the combustion chamber 27 so as to encounter the exhaust stream flow. The ignition module 30 is releasably affixed to and frictionally engages the inner surface 22 of the peripheral wall 21 of the housing 20. Thus engaged, the ignition module 30 is oriented perpendicular to the direction of the exhaust stream flow (Arrows P and Q). The ignition module 30 includes the combustion grill 31 having a grid-like configuration and forming multiple passageways across the cross-section of the combustion chamber 27 through which the exhaust stream must flow en route to the tailpipe B. Consequently, as shown by Arrows P and Q, the exhaust stream flows through, over and about the combustion grill 31 within the combustion chamber 27.

As most clearly shown in FIGS. 3–8, the combustion grill 31 preferably includes two banks or grates of electrodes 50: an upstream horizontally-oriented grate 32 of electrodes 50 and a downstream vertically-oriented grate 34 of electrodes 50. The grates 32, 34 are separated a sufficient distance to allow applied current with adequate electric voltage to cause an electrical arc to travel from an electrode 50 in one grate 32, 34 to an electrode 50 in the opposing grate 32,34, causing any uncombusted fuel or oil to ignite while passing through the combustion grill 31 of the ignition module 30. Although described herein as having only two banks or grates 32, 34 of electrodes 50, the combustor 10 of the present invention may be easily modified to contain greater or fewer than two banks of electrodes 50 to accommodate various engine types and applications.

The electrodes 50 are made of steel, platinum or other rigid conductive material suited to continued electrical arcing in the environment of the internal combustion engine exhaust stream. Unlike existing spark plugs, the electrodes 50 of the combustor 10 of the present invention provide an elongate electrical arcing surface which will allow an electrical arc to cascade along the length of an electrode 50 as controlled by the spark generation module 70.

The peripheral insulator ring 40 provides one form of a means to hold and insulate the electrodes 50 to form the grates 32, 34 of the combustion grill 31 of the ignition module 30. Other means may include: individual insulator segments which house one or a plurality of electrodes 50 in differing configurations; separate but joinable insulator rings 40 to hold an individual grate 32, 34 of electrodes 50, thereby allowing individual grates to be replaced as needed or additional grates added in series to provide a greater electrical arc contact volume.

The insulator ring 40 is preferably circular in shape to comport with the peripheral shape of the inner surface 22 of the wall 21 of the housing 20 (FIG. 6). The shape of the insulator ring 40 may be adjusted to accommodate a differently shaped housing 20. The insulator ring 40 is preferably made of material that is highly electrically-resistive and capable of withstanding thermal degradation caused by substantial temperature variances, such as those associated with internal combustion engine exhaust streams. In addition, the insulator ring 40 is preferably made of material with a low coefficient of thermal expansion to accommodate the large temperature swings encountered during use and operation with an internal combustion engine, from ambient temperature to combustion engine operating temperature. Minimizing expansion and contraction of the insulator ring 40 will increase longevity of the ignition module 30 and combustor 10 and improve ability of the combustor 10 to maintain appropriate conductive or insulated connections of the electrodes 50. Such electrically and thermally resistive material may include plastic, ceramic or other like material.

As most clearly shown in FIG. 7, the insulator ring 40 includes the outer cylindrical surface 41 and a concentric inside cylindrical surface 43. With the ignition module 30 properly installed and seated within the combustion chamber 27 of the housing 20 (FIG. 4), the outer surface 41 of the insulator ring 40 rests adjacent and frictionally engages the inner surface 22 of the wall 21 of the housing 20. The insulator ring 40 includes a plurality of shallow, cylindrical wells 44 (FIG. 8) uniformly dispersed about the inside surface 43 of the insulator ring 40 (FIG. 7). The wells 44 extend from the inside surface 43 of the insulator ring 40 to only partially penetrate the insulator ring 40. The wells 44 are oriented in the insulator ring 40 such that the central axes of the wells 44 are parallel and substantially coplanar. In addition, each well 44 is axially aligned with an opposing penetration 48, located on the diametrically-opposed side of the inside surface 43 of the insulator ring 40. Thus disposed, a mouth 45 of each well 44 faces a mouth 47 of an opposing penetration 48.

The wells 44 are each sized to securely receive one end of an electrode 50. A well 44 prevents an electrode 50 held within the well 44 from electrically grounding to earth or zero voltage potential by preventing an insulated end 54 of an electrode 50 from coming into contact with the inner surface 22 of the wall 21 of the housing 20.

Figure 3:
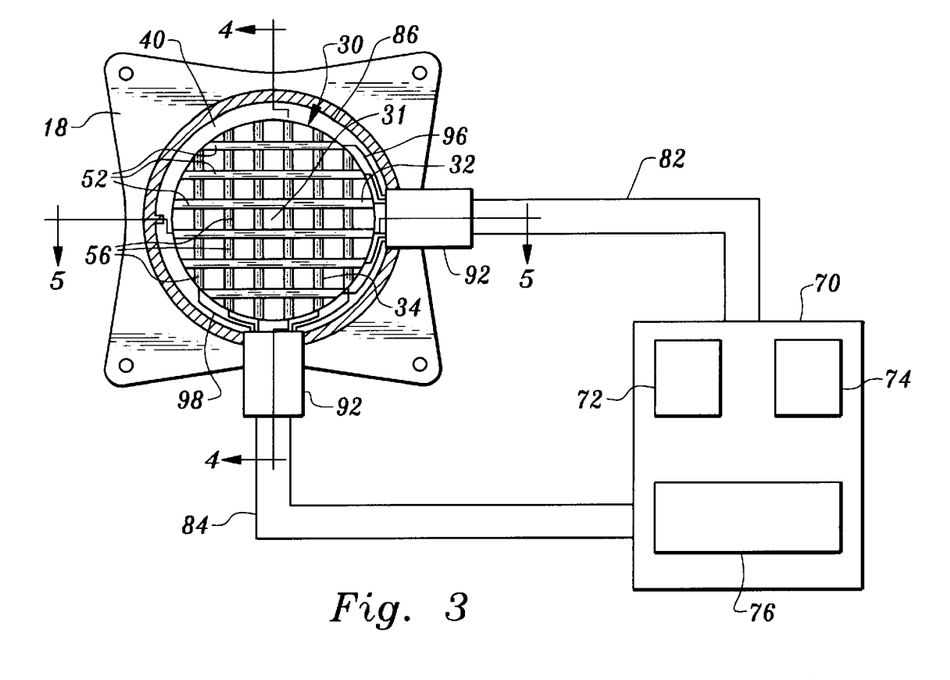
FIG. 3 is a cross-sectional view taken along lines 3—3 of FIG. 1 illustrating the electrode grill of the present invention from the inlet side of the combustion chamber of the combustor of the present invention and including a general schematic for the spark generation module.

A plurality of penetrations 48 are similarly uniformly dispersed about the circumference of the insulator ring 40 (FIG. 7). The penetrations 48 serve a dual purpose. First, the penetrations 48 allow a plurality of electrodes 50 to extend through the insulator ring 40 to physically and conductively engage the inner surface 22 of the wall 21 of the housing 20, thereby creating a low voltage potential node, or ground to earth, for the electrode 50 affixed within the penetration 48 and extending sufficiently to touch the inner surface 22 of the wall 21 of the housing 20. Secondly, the penetrations 48 allow other electrodes 50 to be physically coupled with electrical connectors 90 via electrical cables or wires 80, to ultimately connect with the spark generation module 70 (FIG. 3).

A plurality of the electronically-connected and physically-coupled electrodes 50 act as cathodes 52 to supply high voltage potential electrical current to the combustion grill 31 of the ignition module 30. The high voltage current creates an electrical arc with a plurality of anodes 56 of the combustion grill 31 for ignition of uncombusted fuel or oil entrained within the exhaust stream. Hence, a conductive end 53 of each cathode 52 will be secured within a penetration 48 of the insulator ring 40 (FIG. 3). The conductive end 53 (FIG. 5) of each cathode 52 will be connected to the spark generation module 70 (FIG. 3) via higher voltage cables 82. An insulated end 54 (FIG. 5) of each cathode 52 will be seated in a well 44 of the insulator ring 40 to prevent the insulated end 56 of the cathode from touching the inner surface 22 of the wall 21 of the housing 20, thereby avoiding the creation of a short circuit of the high voltage electrical current, intended to create the electrical arc, to earth or ground potential. The cathodes 52 preferably comprise the electrodes 50 of the horizontal grate 32 of the combustion grill 31 of the ignition module 30.

The plurality of anodes 56 of lower voltage potential are situated adjacent but not touching the cathodes 52 of higher voltage potential. The anodes 56 act as electrical current receptors or low voltage potential sites. In one form of a preferred embodiment of the combustor 10 of the present invention, the anodes 56 preferably comprise the vertical grate 34 (FIG. 3) of the combustion grill 31 of the ignition module 30. Both ends 53 of each anode 56 are seated and extend through penetrations 48 in the insulator ring 40 such that each end 53 of each anode 56 physically contacts and conductively connects with the inner surface 22 of the wall 21 of the housing 20, thereby creating a low voltage electrode 50 with ground or earth voltage potential or some other potential lower than that of the cathode 53.

In an alternative form of the preferred embodiment of the combustor 10 of the present invention, the insulated end 54 of each anode 56 is seated and secured within a well 44 of the insulator ring 40 to prevent the anode 56 from contacting the inner surface 22 of the wall 21 of the housing 20, thereby avoiding creation of a direct electrical connection to ground or earth potential. The opposing conductive end 53 of each anode 56 is seated within a penetration 48 of the insulator ring 40. The conductive end 53 of each anode 56 is electrically coupled to the spark generation module 70 via lower voltage cables 84 and appropriate electrical connectors 90. A lower voltage, greater than ground potential, is applied to the anodes 56 by the spark generation module 70 while a higher voltage is applied to the cathodes 52. The difference between the higher voltage electric current supplied to a cathode 52 and a lower voltage electric current supplied to an anode 56 is sufficient to cause an electrical arc to bridge the gap H between a cathode 52 and a corresponding paired anode 56.

In an alternative operating mode, the spark generation module 70 sets the voltage potential of neighboring anodes 56 at a level higher than that of an arcing anode 56 acting as the electrical current receptor with a paired arcing cathode 52. The voltage potential of neighboring non-arcing anodes 56 is set at a level greater than that of the arcing anode 56, but less than that of the paired arcing cathode 52, and sufficiently low to prevent unintended potential electrical arcing between neighboring anodes 56 or the intended arcing anode 56.

The insulator ring 40 acts as both a foundation for the electrodes 50 as well as a means to mount the ignition module 30 with the combustion grill 31 within the combustion chamber 27 of the housing 20. To simplify manufacturing, the ignition module 30 is preferably press fit into the housing 20 to releasably but securely frictionally engage the inner surface 22 of the wall 21 of the housing 20.

As most clearly shown in FIGS. 7 and 8, proper positioning of the ignition module 30 within the combustion chamber 27 of the housing is ensured by two interior features of the housing 20. First, the stop ring 23 extending inwardly from the periphery of the inner surface 22 of the wall 21 of the housing 20 acts as a barrier or limiting means to prevent the insulator ring 40 of the ignition module 30 from being pressed past the approximate midpoint of the housing 20. Second, the insulator ring 40 must be oriented such that the profile of the alignment ridge 24, extending inwardly from the inner surface 22 of the wall 21 of the housing 20 properly mates with an alignment groove 42 in the outer surface 41 of the insulator ring 40. If the ignition module 30 is not oriented so that the alignment ridge 24 of the housing 20 and the alignment groove 42 of the insulator ring 40 are not properly positioned and aligned, the insulator ring 40 and combustion grill 31 of the ignition module 30 may not be slidably pressed down the length of the housing 20 such that the insulator ring 40 and combustion grill 31 rest adjacent the stop ring 23.

As shown in FIGS. 1 and 2, an expansion chamber 60 is releasably coupled to the downstream second end 26 of the housing 20. The expansion chamber 60 provides an increased receiving volume which accommodates the increased volumetric flow rate of the exhaust stream caused by the combustion of the entrained fuel and oil of the exhaust stream while passing through the combustion chamber 27 of the housing 20 and the combustion grill 31 of the ignition module 30. The expansion chamber 60 is joined to the housing 20 by flanged connections 18, equivalent to those used to connect the upstream first end 25 of the housing 20 to the upstream exhaust manifold region A. Similar fastener means 19 releasably attach the expansion chamber 60 to the housing 20 by joining the flanged connections 18.

Referring still to FIGS. 1 and 2, the expansion chamber 60 includes an upstream intake end 63 which is coupled to the downstream second end 26 of the housing 20. An expansion section 64 of the expansion chamber 60 tapers radially outward in a downstream direction from the intake end 63 of the expansion chamber 60. The expansion section 64 abuts and merges into an elongate, preferably cylindrical, body portion 62 of the expansion chamber 60. The body portion 62 has sufficient internal diameter I to provide a sufficient expansion chamber 60 volume to accommodate the additional volume of combustion gases generated by the oxidation of entrained fuel or oil in the exhaust stream by the ignition module 30 within the combustion chamber 27. The expansion chamber 60 has sufficient accommodating volume to ensure that the operating pressure at the outlet 29 of the combustion chamber 27 is minimized. By minimizing the outlet 29 operating pressure, parasitic back pressure is not placed on the exhaust outlet of the internal combustion engine, thereby optimizing engine performance and efficiency. The body portion 62 of the expansion chamber 60 extends from the expansion section 64 to abut and merge into a reducer section 65 (FIG. 2). The reducer section 65 radially tapers and converges to form a downstream discharge end 66 of the expansion chamber 60. The exhaust stream flows in a direction show by Arrow S from the reducer section 65 of the expansion chamber into the downstream portion of the vehicle exhaust system, as it travels toward the tailpipe B. The discharge end 65 of the expansion chamber 60 is likewise preferably surrounded by a flanged connector 17 which is releasably coupled to the upstream end of the downstream portion of the vehicle exhaust system using similar fastener means 19. The length, and hence, the volume of the expansion chamber 60 may be adjusted to accommodate varying engine application requirements.

Referring to FIG. 3, the spark generation module 70 manages the operation of the ignition module 30 and controls the flow and voltage potential of electrical current to the electrodes 50 of the combustion grill 31. The spark generation module 70 includes a coil 72 which increases the voltage of supplied electrical current to a sufficient level to cause the electrical current to arc across the gap H between a cathode 52 and a paired anode 56. The coil 72 may be one of several currently available types used to supply electrical current at sufficient voltage to the ignition system of internal combustion engines used in automobiles, boats and other recreational vehicles. The coil 72 delivers its electrical charge to a distributor 74. The distributor 74 provides one form of a means for controlling and managing the supply of electrical current provided to the electrodes 50 of the combustor 10. The coil 72 and distributor 74 are preferably controlled by a programmable computer module 76. The computer module 76 is programmable such that the output of the coil 72 and distributor 74, and hence, the ignitive energy generated by the combustion grill 31 of the ignitive module 30, may be easily modified to accommodate various types of internal combustion engines in varied operating conditions with varied amounts of entrained fuel and oil contained in the exhaust stream of the internal combustion engine.

The combustor 10 and the spark generation module 70 may be operated in various modes to accommodate differing operating conditions. In a first operating mode, the computer module 76 of the spark generation module 76 causes the coil 72 and distributor 74 to supply electrical power only to the cathodes 52 of the combustion grill 52. In this first operating mode, both ends 73 of the anodes 56 are physically and electrically in contact with the inner surface 22 of the wall 21 of the housing 20, thereby creating an electrical path to ground which establishes the lowest electrical potential within the electrical circuit formed by the combustor 10 and vehicle exhaust piping system. Thus, electrical current supplied to cathodes 52 of the combustion grill 31 will seek to arc to the nearest node of minimal electrical potential on an anode 56.

The arc path sought by electrical current supplied to a cathode 52 will be a function of several variable factors, including: (1) the electric potential or voltage present along the length of each cathode 52, (2) the electrical resistance present along the length of each cathode 52, (3) the electrical resistance present in the voids between each cathode 52 and adjacent anodes 56, (4) the electrical resistance present along the length of each anode 56, and (5) the electrical potential or voltage present along the length of each anode 56. The combustor 10 of the present invention is designed to use these variables effectively to maximize combustion of entrained fuel and oil in the exhaust stream presented to the combustor 10 from an internal combustion engine. To more clearly understand the interplay between these variables and the novel and unique operation of the combustor 10 of the present invention in dealing with these variables, each is briefly discussed below.

The first variable, voltage potential present along the length of each cathode 52, is determined by the available output of the coil 72 and the distributor 74, which is managed and controlled by the computer module 76 of the spark generation module 70. The spark generation module 70 may include a feedback control loop which allows the computer module 76 to constantly monitor various operating conditions within and adjacent the combustor 10 to determine the voltage and current requirements necessary for various operating conditions.

The feedback loop would use sensor data transmitted from an oxygen sensor 14 installed in a tapped port 15 at a location downstream of the ignition module 30 to measure the oxygen content of the exhaust stream subsequent to passage through the ignition module 30 of the combustor 10. A control software program present within the computer module 76 of the spark generation module 70 would correlate and compare the signal from the oxygen sensor 14 to a known oxygen content of the exhaust stream at a point in the vehicle exhaust piping system upstream of the ignition module 30. Where the measured downstream oxygen content of the exhaust stream is minimal, the computer module 76 of the spark generation device 70 would actuate an air injector 12 located in a port 13 in the vehicle exhaust piping system to incrementally inject air into the exhaust stream. The computer module 76 of the spark generation module 70 would then monitor the downstream oxygen content as a measure of combustion of entrained fuel or oil within the exhaust stream by the combustor 10 and modify either the air injection volume or the ignitive energy of the combustion grill 31 to optimize oxidation of entrained combustibles in the exhaust stream to minimize discharge of unspent combustibles out the tailpipe B of the vehicle exhaust system.

Although not shown in the accompanying drawings, the combustor 10 of the present invention may utilize other sensor means to measure operating pressure, temperature, hydrocarbon content, volumetric flow rate and other operating variables. The signals generated by these sensor means, appropriately located in the exhaust system piping, may then be transmitted to the spark generation module 70 to allow further optimized oxidation of combustibles entrained in the engine exhaust stream.

The second variable, electrical resistance present along the length of each cathode 52, will be a function of the material from which the cathode 52 is made, e.g. steel, platinum, copper or other conductive material, combined with the exterior coating, e.g. fuel, oil or other deposits, developed on the exterior surface of a cathode 52 while subjected to the exhaust flow from an internal combustion engine. A cathode 52 may become fouled on its exterior surface with the same entrained fuel and oil in the exhaust stream which the combustor 10 seeks to fully oxidize. This coating will vary in thickness and composition, depending on the exhaust operating temperature, richness of the exhaust stream, and ignitive energy applied to the combustion grill 31.

The third variable, electrical resistance present within the voids between each cathode 52 and anode 56, is determined by the composition of the exhaust stream within the void, as well as the size of the void. The size of the void is determined by the gap H (FIG. 8) between a cathode 52 and anode 56. The gap H will be substantially constant and determined by the original arrangement and spacing of the electrodes 50 within each grate 32, 34 of the combustion grill 31 and insulator ring 40 of the ignition module 30. However, the composition of the void between a cathode 52 and anode 56, and hence, the electrical resistance, will vary considerably depending on the operating condition of the internal combustion engine. For example, if the engine is cold, the fuel mixture will likely be rich and consequently, the exhaust stream will likely have a greater percentage of entrained uncombusted fuel and oil. Therefore, in this rich operating condition, the void resistance will likely be greater, the cathodes 52 will likely have a heavier layer of fuel and oil on their exterior, the overall electrical arc resistance will be greater, and hence, the spark generation module 70 would increase the voltage supplied to a cathode 52 to overcome this increased electrical arc resistance between a cathode 52 and a paired adjacent anode 56.

If the internal combustion engine is warmed and operating at a higher temperature, the fuel mixture is likely not as rich, hence, the exhaust stream would likely contain a lower percentage of entrained uncombusted fuel and oil. Hence, the thickness of the coating fouling the cathodes 52 or anodes 56 would be less, the resistance within a void would be less, and consequently, less electrical current and voltage would be required to cause an electrical arc between a cathode 52 and an adjacent paired anode 56.

The fourth variable, electrical resistance present along the length of each anode 56, is a function of those same variables described above for the cathode 52. Hence, the electrical resistance present along the length of each anode 52 will likely increase or decrease in a manner corresponding to the electrical resistance present along the length of each cathode 52, assuming all electrodes 50 are similarly coated and fouled by entrained fuel or oil within the exhaust stream.

The fifth variable, electric voltage potential present along the length of each anode 56, will be a function of the preferred operating mode. Voltage at each anode 56 will necessarily be lower than the electric voltage potential of a neighboring paired cathode 52. Hence, in a first operating mode with all anodes 56 having ground potential, the potential difference between a paired cathode 52 and anode 56 will be a function only of the voltage supplied to the cathodes 52. However, where additional control of the arcing pattern, distribution and frequency is desired, electrical power may also be supplied to the anodes 56. By simultaneously controlling and varying the electrical power supplied to the cathodes 52 and the anodes 56, the spark generation module 70 may control the electric voltage potential difference between a cathode 52 and multiple anodes 56. Hence, in a second operating mode with a constant voltage applied to a cathode 52, a lower voltage applied to all but one anode 56, with the remaining anode 56 having zero potential or ground, the spark generation module 70 may be programmed to sequentially switch the anode 56 at ground potential to cause the arc pattern to travel along the length of the cathode 52, generating an arc between subsequent anodes 56 whose electrical potential is switched to ground.

One or more of the electrodes 50 may also be replaced with an electrode 50 made of highly electrically-resistive material that will cause the material of the electrode 50 to heat when electrical current is applied. A heating electrode 50 may be used to oxidize material which may have substantially fouled neighboring electrodes 50.

As previously described for the second operating mode, the electrodes 50 are arranged in a grid pattern (FIGS. 3 and 7) to provide a means to vary the electrical arcing pattern between anodes 56 and cathodes 52. In one operating mode, all the electrodes 50 in one grate 32, 34 of the combustion grill 31 may be designated as cathodes 52, and the electrodes 50 in the remaining grate 32, 34 may be designated as anodes 56. With the central axes of the cathodes 52 oriented perpendicularly to the central axes of the anodes 56, the arcing pattern may be controlled by the spark generation module 70 to ensure that electrical arcs occur and are widely distributed across the area of the combustion grill 31, maximizing the potential for entrained combustibles within the exhaust stream to come into contact with the ignition energy of a plurality of electrical arcs to cause the entrained combustibles to ignite and substantially oxidize.

The combustor 10 of the present invention would operate in a first mode where the electric potential at each cathode 52 is higher than the electric potential along each cathode 52, with one cathode 52 having a higher potential than the remaining cathodes 52. The cathode 52 having a higher potential would be sequentially switched in series from the first cathode 52 to an adjacent cathode 52, to the next adjacent cathode and so on, with the process continually repeating.

In this preferred operating mode, as each cathode 52 is switched to a higher voltage, the anodes 56 are then likewise switched between a base voltage which is lower than the cathode 52 voltage, and a ground voltage. This switching is performed in series from one anode 56 to the next anode 56, creating a cascade effect which causes the arc pattern to travel across the cross-sectional area of the combustion grill 31. The switching is accomplished by the spark generation module 70 and its associated computer module 76.

When the exhaust stream is rich with entrained fuel and oil, the arcing frequency and switching occurs at a rate sufficient to maximize oxidation of the entrained fuel and oil. As the richness of the exhaust stream decreases and the percentage of entrained fuel and oil in the exhaust stream decreases correspondingly, the spark generation module 70 and computer module 76 may adjust the voltage switching and arcing frequency downward to conserve power, while still ensuring that the arcing pattern distribution and frequency is sufficient to substantially oxidize the reduced volume of entrained fuel and oil in the exhaust stream. This control function is assisted by the feedback loop between the oxygen sensor 14 and the computer module 76 of the spark generation device 70.

Although the combustion grill 31 will provide a means to hold a flame along the grill 30, this means of ignition is considered a derivative benefit of the primary arcing ignition created by the combustor 10 of the present invention. In actual operation, the exhaust stream velocity may be sufficiently high through the combustor 10 that a flame may not be retained or held along the region defined by the combustion grill 31. Consequently, the combustor 10 of the present invention uniquely provides sufficient ignitive energy in the combustion grill 31 of the ignition module 30 to generate a plurality of combustion zones throughout the grid of the combustion grill, about the combustion chamber 27 of the housing 20, and inward into the expansion chamber 60. The flow of the exhaust stream through and about the grid of the combustion grill 31 formed by the grates 32, 34 will induce substantial turbulence and mixing of the exhaust stream as it passes through the combustion grill 31 to maximize the potential for the entrained combustibles to come into contact with ignition energy from either the arcing pattern along the combustion grill 31 or other ignited and igniting combustibles within the exhaust stream.

In use and operation, the combustion grill 31 provides a medium to allow a plurality of electrical arcs to be generated across the breadth of the surface defined by the opposing grates 32, 34 of the combustion grill 31 of the ignition module 30. The electrical arcs ignite and substantially oxidize any uncombusted fuel or oil entrained within the exhaust stream.

The electrical arc is the result of a high temperature flow of electrical current from cathodes 52 to paired anodes 56, where paired cathodes 52 and anodes 56 are separated by the spark gap H. The spark generation module 70 allows sufficient electrical voltage to be applied to each cathode 52 to cause the electrical current to bridge the gap H between the cathode 52 and the paired anode 56, creating the electrical arc.

The arrangement and distribution of the cathodes 52 and anodes 56 within the grates 32, 34 of the combustion grill 31 of the ignition module 30 allows multiple electrical arc distribution patterns to be generated to optimize the combustion of entrained fuel and oil within the exhaust stream. The electrical arc distribution pattern and frequency may be altered by simple adjustment or modification of the spark generation module 70 control algorithms present with the computer module 76. For example, each cathode 52 can electrically arc across to multiple anodes 56 adjacent any portion of the length of the cathode 52. Arcs may be generated between cathodes 52 and adjacent anodes 56 within the same grate 32, 34 or between cathodes 52 and anodes 56 within an opposing grate 32, 34.

During use and operation of the combustor 10 with an internal combustion engine, the exhaust stream P flows toward the upstream first end 25 of the housing 20 through the inlet 28 (FIG. 8) and into the combustion chamber 27. As the exhaust stream flows through the grid created by the grates 32, 34 (FIG. 7) of the combustion grill 31 of the ignition module 30, turbulence is created which maximizes the mixing of the exhaust stream. Concurrently, as the exhaust stream flows through the combustion chamber 27 and through the combustion grill 31, the distributed electrical arcing pattern maximizes exposure of the ignitive energy of the electric arcs to the uncombusted fuel or oil entrained within the exhaust stream after leaving the internal combustion engine. As the entrained fuel or oil is combusted, additional combustion gases are created which increase the volumetric flow rate and linear velocity of the exhaust stream. The exhaust stream flows toward the downstream second end 26 of the housing 20 to exit through the outlet 29 of the combustion chamber 27 to enter the expansion chamber 60. The expansion chamber 60 provides sufficient additional volume to accommodate the increased volume of the additional gases of combustion generated by combustion of the previously uncombusted fuel or oil within the exhaust stream. Thus, the expansion chamber 60 minimizes the back pressure placed on the combustion chamber 27.

The increased exhaust stream flow velocity generated by the expansion of combustion gases created by the ignition of the entrained fuel and oil may be used as a means for energy recovery to increase the performance and efficiency of the internal combustion engine, or, to drive ancillary devices associated with the vehicle or internal combustion engine. For example, a turbo compressor may be interposed within the exhaust flow stream downstream of the ignition module 30. The turbo compressor may be used to turbo charge the air intake for the internal combustion engine, or, to drive a supplemental electrical generator to support primary electrical generating systems. The ancillary uses of the enhanced flow velocity will depend on the exhaust stream flow characteristics and the available power generated by the ignition and combustion of the entrained combustibles within the exhaust stream.

Figure 9:
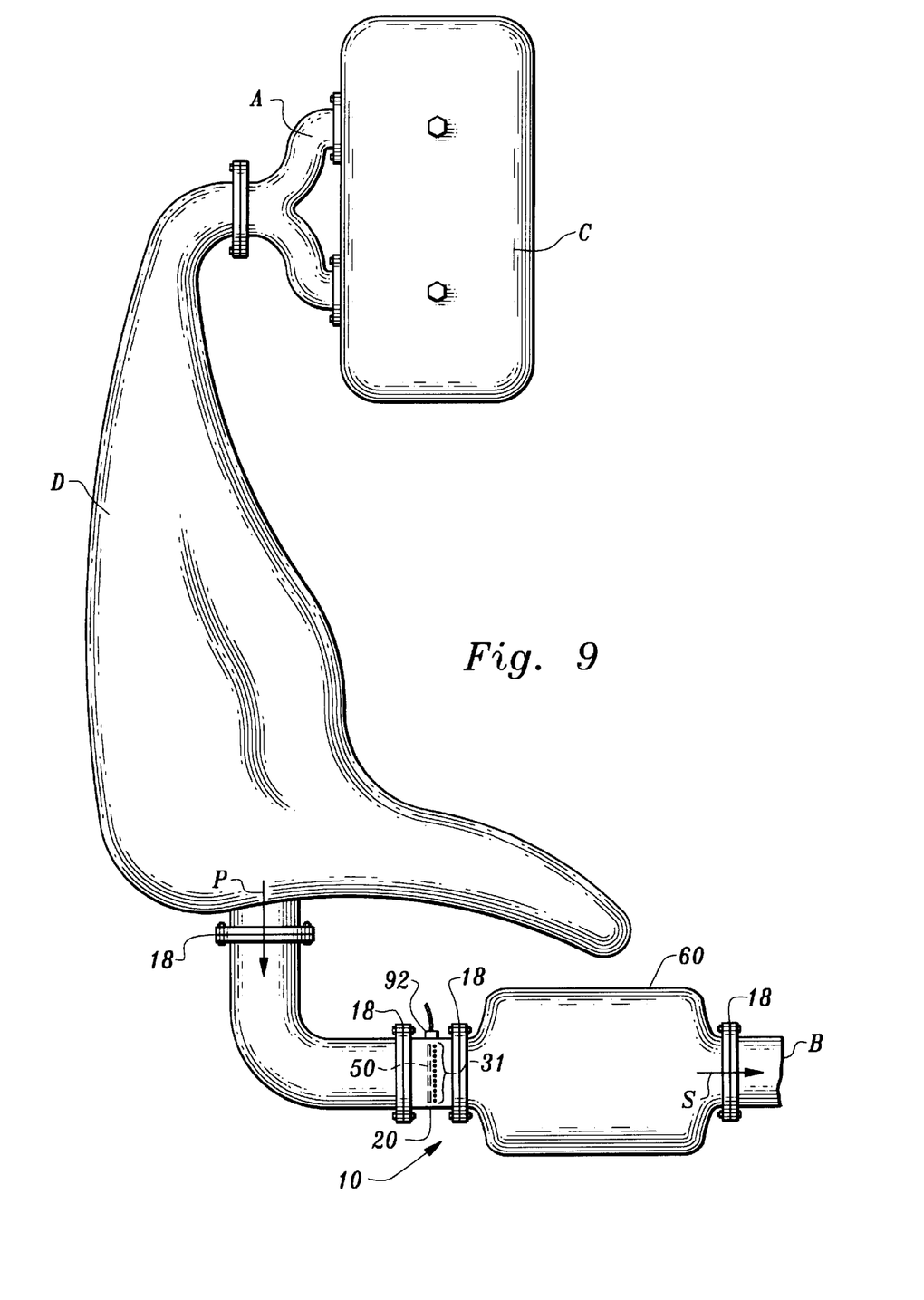
FIG. 9 is a plan view of the present invention installed on the exhaust system and expansion chamber of a two-cycle engine.

The combustor 10 of the present invention may be used for reducing emissions of uncombusted hydrocarbons in any type internal combustion engine. FIGS. 1 and 2 illustrate the combustor 10 of the present invention as it would typically be installed in the exhausting piping of an automobile. Similar installations may be used for operation with diesel engines. FIG. 9 illustrates a typical installation of the combustor 10 of the present invention on the exhaust system of a two-stroke engine used in a motorcycle or personal watercraft, with the combustor 10 installed on the primary expansion chamber of the exhaust system of the two-stroke engine.

The combustor 10 of the present invention is intended to operate substantially continuously when used on either a diesel or 4-stroke gasoline engine. Where the combustor 10 is installed on the exhaust system of a two-stroke engine, such as that shown in FIG. 9, the computer module 76 of the spark generation module 70 would be programmed to cause the ignition module 30 to ignite the entrained combustibles in appropriate synchronization with the two-stroke engine cycles to maximize engine efficiency and performance. The ignition and combustion would be timed to minimize any pressure wave reverberation which might increase the back pressure on the internal combustion engine exhaust outlet, thereby decreasing the two-stroke engine's overall performance and efficiency.

This disclosure is provided to reveal a preferred embodiment of the invention and a best mode for practicing the invention. Having thus described the invention in this way, it should be apparent that various different modifications can be made to the preferred embodiment without departing from the scope and fair meaning of this disclosure. When structures are identified as a means to perform a function, the identification is intended to include all structures which can perform the function specified.

What is claimed is:

1. A combustor to heat and substantially oxidize fuel and oil entrained in the exhaust stream of an internal combustion engine, wherein the exhaust stream is conducted and flows via exhaust piping from an exhaust manifold attached to the internal combustion engine to the ambient atmosphere adjacent the end of a tailpipe of the exhaust piping, said combustor comprising in combination:

a housing;

said housing having a first end;

said first end coupled to an upstream end of the exhaust piping nearest the exhaust manifold of the internal combustion engine;

said housing having a second end opposite said first end;

an expansion chamber having an intake end coupled to said second end of said housing and a downstream discharge end opposite said intake end, nearer the tailpipe of the exhaust piping;

said discharge of said expansion chamber coupled to a downstream end of the exhaust piping nearer the tailpipe end of the exhaust piping;

said housing including a combustion chamber;

said combustion chamber having a combustion grill including a plurality of electrodes;

said combustion grill substantially transecting said combustion chamber such that the exhaust stream flows over, about and through said combustion grill en route to said expansion chamber;

said electrodes having a rod shape with central longitudinal axes;

means to generate electric potential difference between at least two of said plurality of electrodes; and said electric potential difference sufficient to generate an electrical arc which travels between said at least two of said plurality of electrodes.

2. The combustor of claim 1 wherein said plurality of electrodes are oriented to form at least one planar combustion grill.

3. The combustor of claim 2 wherein said plurality of electrodes are oriented to form at least two planar combustion grills.

4. The combustor of claim 3 wherein said plurality of electrodes of at least one planar combustion grill are oriented in a common parallel direction such that said plurality of electrodes of said first combustion grill are perpendicular to said plurality of electrodes of an adjacent combustion grill.

5. The combustor of claim 4 wherein said combustion grill includes a means to insulate said electrodes from each other, said insulation means conforming to the shape of said housing;

wherein said insulation means is ring-shaped; and wherein said insulation means is made from high temperature plastic.

6. The combustor of claim 5 wherein said electrodes are spaced uniformly.

7. The combustor of claim 6 wherein said housing includes a means to recover energy from the exhaust stream, wherein said means to recover energy is located downstream of said combustion grill.

8. The combustor of claim 7 wherein said energy recovery means includes a turbo fan driven by a mass flow rate of the exhaust stream.

9. The combustor of claim 8 wherein said energy recovery means drives an electrical generator.

10. A spark generating device for combusting entrained fuel within the exhaust piping of an internal combustion engine, said device comprising in combination:

a combustion grill;

said combustion grill including at least two electrodes;

said at least two electrodes shaped like rods with central longitudinal axes;

said at least two electrodes oriented such that said central longitudinal axes of said at least two electrodes are substantially parallel.

11. The spark generating device of claim 10 wherein said at least two electrodes are both perpendicular to a direction of exhaust flow.

12. The spark generating device of claim 11 wherein a second grill is located downstream from said first grill, said second grill including at least two electrodes perpendicular to a direction of exhaust flow.

13. The spark generating device of claim 12 wherein said at least two electrodes of said second grill are oriented perpendicular to said at least two electrodes of said first grill.

14. The spark generating device of claim 13 wherein a distance between said at least two electrodes of said first grill is equal to a distance between said at least two electrodes of said second grill and equal to a distance between said first grill and said second grill.

15. A kit for insertion into an exhaust stream of a two-cycle internal combustion engine having an exhaust piping system which includes a primary expansion chamber, said kit combusting fuel or oil entrained within the exhaust stream, said kit comprising in combination:

a combustor;

said combustor including a housing;

said housing having an inlet attached to a primary expansion chamber of the two-cycle internal combustion engine;

said housing having an outlet attached to an intake end of a primary expansion chamber;

said primary expansion chamber including a discharge end opposite said intake end for discharging said exhaust stream to the atmosphere;

said housing surrounding and forming a combustion chamber;

said combustion chamber including a combustion grill, said combustion grill including at least two electrodes;

said combustion grill including a means to insulate said at least two electrodes;

a means to generate electric potential between said at least two electrodes; and said electric potential sufficient to create an electrical arc between said at least two electrodes.

16. The kit of claim 15 wherein said means to generate electric potential includes a means to time said electric potential generating means such that said electrical arc is synchronized with the engine combustion cycles so as to minimize deleterious combustion pressure wave reverberation.

17. The kit of claim 16 wherein said housing includes a pressure sensor located upstream of said combustion grill, said pressure sensor continuously communicating with said means to generate electrical potential, said means to generate said electrical potential including a control means, said control means capable of synchronizing said electrical potential generating means such that said electrical arc is synchronized with the combustion cycles so as to minimize deleterious combustion pressure wave reverberation.

18. The kit of claim 15 wherein said housing includes an air injector located upstream of said combustion grill, wherein said air injector injects sufficient ambient air into said housing to allow complete combustion of fuel and oil entrained in the exhaust stream.

19. The kit of claim 18 wherein said expansion chamber includes an oxygen sensor located nearest the discharge end of said expansion chamber, said oxygen sensor continuously communicating with a fuel/air mixture monitoring and control device, said control device continuously adjusting the volumetric flow rate of ambient air injected by said air injector into said combustion chamber.

20. The kit of claim 15 wherein said combustion grill includes at least one electrode with substantial electrical resistance sufficient to cause said at least one electrode to generate heat to warm the exhaust stream.

* * * * *